3,119,844
REGENERATION OF ACROLEIN DIMER FROM
ITS POLYMERS
Glen D. Lichtenwalter, La Porte, Tex., Robert W. Fourie, South Norwalk, Conn., and Gregor H. Riesser, Pasadena, Tex., assignors to Shell Oil Company, New York, N.Y., a corporation of Delaware
No Drawing. Filed Sept. 14, 1962, Ser. No. 223,836
7 Claims. (Cl. 260—345.9)

This invention relates to a process for the production and recovery of monomeric 3,4-dihydro-1,2-pyran-2-carboxaldehyde (an acrolein dimer) from its polymers. More particularly, this invention relates to a catalyzed accelerated depolymerization of 3,4-dihydro-1,2-pyran-2-carboxaldehyde polymer and recovery of the acrolein dimer, monomeric 3,4-dihydro-1,2-pyran-2-carboxaldehyde.

It is known that 2-propenal, acrolein, reacts with itself by a Diels-Alder reaction to form monomeric 3,4-dihydro-1,2-pyran-2-carboxaldehyde, or, as it is commercially known, acrolein dimer. This dimer is a heterocyclic unsaturated aldehyde of the structure

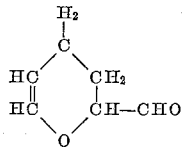

Acrolein dimer is a highly reactive dimer containing both a vinyl ether linkage and aldehyde functionality. There are, therefore, several possible reactions leading to polymers. When freshly prepared it is a clear water-white mobile liquid having a refractive index of about 1.463 to 1.466 and a boiling point of about 88° C. under 100 millimeters' mercury pressure and about 146° C. under 760 millimeters' mercury pressure. Because of its particular chemical structure it is an unusually versatile chemical intermediate which can be employed for the preparation of a wide variety of chemical compounds that are useful in diverse fields.

When acrolein dimer is stored in a sealed transparent container, such as a clear glass container, in a location open to light, it is coverted in a relatively short time, usually within not more than about a month, to a viscous liquid, and eventually to a polymeric solid. Polymer formation is markedly enhanced by the presence of oxygen. Furthermore, water catalyzes the polymerization as do various bases, acids and a number of metal salts.

The degradation of acrolein dimer during storage is characterized by progressive increases in molecular weight, viscosity, opacity, density, and refractivity. As the polymerization proceeds and the dimer-polymer mixture becomes increasingly viscous, a polymer phase is observed to separate.

Acrolein dimer undergoes two types of polymerization, reversible and irreversible. In most instances, the extent of irreversible polymerization is much less than the degree of reversible polymerization, perhaps, on the average, one tenth as much.

The change in refractivity is a convenient measure of the degree of polymerization. The refractive index at 30° C. ranges from 1.4588 for pure dimer to about 1.5, at which point, the dimer-polymer mixture becomes too viscous for ready measurement of refractive index.

The revertible form of the acrolein dimer polymer which generally constitutes 90–98% of the total polymer is reverted to acrolein dimer by distillation. However, at suitable distillation conditions the rate of reversion is small and relatively long times or large facilities are required for large scale operations. Increased reversion rates, therefore, would be highly desirable and result in the need for smaller distillation facilities.

It has been found that monomeric acrolein dimer can be regenerated from its revertible polymers and recovered by simultaneous catalyzed depolymerization of the polymer and distillation of acrolein dimer from the resulting mixture. Those substances which catalyze the polymerization of acrolein dimer and are substantially less volatile than acrolein dimer are useful for catalyzing depolymerization of the polymer while simultaneously distilling acrolein dimer from the mixture. The preferred substances are those polymerization catalysts which have boiling points at least 20° C.—better at least 50° C.—higher than the boiling temperature of acrolein dimer at equal pressures. Of these substances various non-volatile organic and inorganic bases are particularly useful, including salts of the organic bases. The tertiary amines and quaternary ammonium bases and their salts are especially useful, particularly the bases. Inorganic basic compounds are useful such as base metal oxides, hydroxides and carbonates, e.g., the alkali and alkaline earth metal oxides and hydroxides.

Typical useful basic catalytic groups include, for example, the aryltrialkylammonium hydroxides, aryltrialkylammonium halides, alkaryltrialkylammonium hydroxides, alkaryltrialkylammonium halides, aralkyltrialkylammonium hydroxides, aralkyltrialkylammonium halides, tetraalkylammonium hydroxides, tetraalkylammonium halides, tertiary heterocyclic amines, alkali metal oxides, hydroxides and carbonates and alkaline earth metal oxides, and carbonates.

Representative basic catalysts are, for example, aryltrialkylammonium hydroxides containing from 6 to 14 carbon atoms in the aryl group and from 1 to 8 carbon atoms in each of the alkyl groups such as, phenyltrimethylammonium hydroxide, phenyltriethylammonium hydroxide, phenyltri-tert-butylammonium hydroxide, phenyltri-n-hexylammonium hydroxide, phenyltri-n-octylammonium hydroxide, naphthyltrimethylammonium hydroxide, and anthryltrimethylammonium hydroxide; similar aryltrialkylammonium halides such as, phenyltrimethylammonium chloride, phenyltrimethylammmonium bromide, and phenyltrimethylammonium iodide, phenyltrimethylammonium fluoride, naphthyltrimethylammonium bromide, and anthryltriethylammonium chloride; alkaryltrialkylammonium hydroxides containing from 6 to 14 carbon atoms in the aryl group and from 1 to 8 carbon atoms in the alkyl group of both the arkaryl and alkyl portion of the compound such as, o-tolyltrimethylammonium hydroxide and xylyltrimethylammonium hydroxide; similar alkaryltrialkyl ammonium halides; aralkyltrialkylammonium hydroxides containing from 6 to 14 carbon atoms in the aryl group and from 1 to 8 carbon atoms in the alkyl group of both the aralkyl and alkyl portion of the compound such as, benzyltrimethylammonium hydroxide and the corresponding halides; tetraalkylammonium hydroxides containing from 1 to 8 carbon atoms in each alkyl group such as, tetramethylammonium hydroxide, tetraethylammonium hydroxide, and tetra-tert-butylammonium hydroxide; tetraalkylammonium halides such as, tetramethylammonium chloride, benzyltrimethylammonium chloride, tetramethylammonium bromide, tetramethylammonium iodide, and tetramethylammonium fluoride; tertiary heterocyclic amines such as, pyridine, quinoline, isoquinoline, 1-methylpyridinium chloride, 1-methylpyridinium bromide, 1-ethylpyridinium iodide, 1-methylquindinium chloride, 1-methylquinolinium bromide, and 1-ethylquinolinium iodide; alkali metal hydroxides such as sodium hydroxide, potassium hydroxide and lithium hydroxide; and alkaline earth metal hydroxides such as, calcium hydroxide and magnesium hydroxide.

The preferred class of basic catalysts are the quatenary ammonium bases and salts thereof, e.g., aryltrialkylammonium hydroxides and halides containing from 6 to 10 carbon atoms in the aryl group and from 1 to 4 carbon atoms in each alkyl group. Of these compounds, the hydroxides are preferred. The most preferred compounds are those wherein aryl is phenyl and each alkyl group contains from 1 to 4 carbon atoms.

The basic catalysts of the invention can be prepared according to methods known in the art. For example, the quaternary ammonium hydroxides are prepared when solutions of quaternary ammonium halides are shaken with silver hydroxide, or when a quaternary ammonium acid sulfate solution reacts with barium hydroxide. In either case, the insoluble silver halide or barium sulfate precipitates leaving the corresponding quaternary ammonium hydroxide in solution.

The following examples illustrate specific embodiments of the present invention and advantages resulting from the practice thereof.

*Example I.—Phenyltrimethylammonium Hydroxide*

Polymerized acrolein dimer was distilled at 50 mm. pressure from a 100° C. bath and the rate of distillation was measured. At the end of 70 minutes, 27% of the polymer was converted to the dimer. When 0.05% of phenyltrimethylammonium hydroxide was added to the polymer immediately before distillation, the rate of distillation was increased and 80% of the polymer was converted to acrolein dimer in 70 minutes.

*Example II.—Tetramethylammonium Chloride*

Polymerized acrolein dimer was distilled at 50 mm. pressure from a 100° C. bath and the rate of distillation was measured. At the end of 50 minutes, 30% of the polymer was converted to the dimer. When 0.4% of tetramethylammonium chloride was added to the polymer immediately before distillation, the rate of distillation was increased and 45% of the polymer was converted to acrolein dimer in 80 minutes.

*Example III.—Quinoline*

Polymerized acrolein dimer was distilled at 50 mm. pressure from a 100° C. bath and the rate of distillation was measured. At the end of 85 minutes, 31% of the polymer was converted to the dimer. When 0.5% of quinoline was added to the polymer immediately before distillation, the rate of distillation was increased and 35% of the polymer was converted to the dimer in 85 minutes.

It may be seen from the foregoing examples that simultaneous catalyzed depolymerization and distillation is highly advantageous and useful for the recovery of acrolein dimer from polymer thereof.

The amount of basic catalyst which may be used in the process of the invention, of course, varies with particular circumstances such as the type and amount of reactants as well as the temperature and pressure at which the process is carried out. Generally, the amount of catalyst required is a catalytic amount. More specifically, the amount may range from about 0.01% to about 5%, with a range of from about 0.05% to about 1.0% preferred. The temperature of the process may range from about 20° C. to about 160° C., with a range of from about 80° C. to about 110° C. preferred, this being selected to minimize thermal degradation of the dimers. The pressure of the process may range from about 1 mm. to about 800 mm., with a pressure of from about 25 mm. to about 100 mm. preferred. The time required for distillation may range from about 1 minute to about 2 hours, with a range of from about 30 to about 60 minutes preferred. By employing the process of the invention, about 70% to about 98% of the polymer can be converted to the dimer.

It will be understood that the foregoing description of the invention and examples set forth are mainly illustrative of the principles thereof. Accordingly the appended claims are to be construed as defining the invention within the full spirit and scope thereof.

We claim as our invention:

1. A process for the recovery of monomeric acrolein dimer from polymeric acrolein dimer which comprises distilling said polymeric dimer in the presence of a non-volatile basic catalyst having a boiling point at least 20°–50° C. higher than the boiling temperature of said acrolein dimer at equal pressures, said catalyst being selected from the group consisting of aryltrialkylammonium hydroxides, aryltrialkylammonium halides, alkaryltrialkylammonium hydroxides, alkaryltrialkylammonium halides, aralkyltrialkylammonium hydroxides, aralkyltrialkylammonium halides, tetraalkylammonium hydroxides, tetraalkylammonium halides, alkali metal oxides, alkali metal hydroxides, alkaline metal oxides and alkaline metal hydroxides, the aryl moiety in each instance being aryl of 6 to 14 carbon atoms and the alkyl moiety in each instance being alkyl of 1 to 8 carbon atoms.

2. A process for the recovery of monomeric acrolein dimer from polymeric acrolein dimer which comprises distilling said polymeric dimer in the presence of tetraalkylammonium halide containing from 1 to 8 carbon atoms in each of the alkyl groups.

3. A process for the recovery of monomeric acrolein dimer from polymeric acrolein dimer which comprises distilling said polymeric dimer in the presence of phenyltrialkylammonium hydroxide containing from 1 to 8 carbon atoms in each of the alkyl groups.

4. A process for the recovery of monomeric acrolein dimer from polymeric acrolein dimer which comprises distilling said polymeric dimer in the presence of phenyltrimethylammonium hydroxide.

5. A process for the recovery of monomeric acrolein dimer from polymeric acrolein dimer which comprises distilling said polymeric dimer in the presence of tetramethylammonium chloride.

6. A process for the recovery of monomeric acrolein dimer from polymeric acrolein dimer which comprises distilling said polymeric dimer in the presence of quinoline.

7. A method of accelerating the distillation rate of polymeric acrolein dimer to monomeric acrolein dimer which comprises adding phenyltrimethylammonium hydroxide to said polymeric mixture.

No references cited.